United States Patent

[11] 3,583,242

[72] Inventors Paul Julius Thornbloom
East Moline;
Raymond Steele Wilkes, Moline, both of, Ill.
[21] Appl. No. 1,145
[22] Filed Jan. 7, 1970
[45] Patented June 8, 1971
[73] Assignee Deere & Company
Moline, Ill.

[54] DRIVE AND CONTROL FOR THE CONVEYOR AND DISTRIBUTING UNIT OF A MATERIAL UNLOADER
14 Claims, 9 Drawing Figs.
[52] U.S. Cl............................................... 74/15.2,
74/15.4, 74/142(R), 74/217(C), 74/217(S), 239/677
[51] Int. Cl............................................F16h 37/06,
F16h 9/04, A01c 19/00
[50] Field of Search........................................ 239/677 X;
74/11, 15.2, 15.4, 217 C, 217 S, 142 R

[56] References Cited
UNITED STATES PATENTS
2,699,337  1/1955  Best............................. 239/677
2,804,308  8/1957  Neighbour et al............. 74/11X
3,290,046  12/1966  Bell et al....................... 239/677

Primary Examiner—Leonard H. Gerin
Attorneys—H. Vincent Harsha, Harold M. Knoth, William A. Murray, John M. Nolan and Jimmie R. Oaks ABSTRACT: A material unloader includes a conveyor and a distributing unit, each of which have a gear case associated therewith. A drive shaft is in axial alignment with the input shaft of the conveyor gear case and the input shaft of the distributing unit is parallel to the drive shaft. A control shaft is parallel to the drive shaft and first and second cam plates are fixed on the control shaft and are rotatable therewith to respectively engage a first clutch member to connect the conveyor gear case with one or the other of two different speed drives from the drive shaft and to engage a second clutch member to connect the distributing unit gear case to the drive shaft. A pawl and ratchet mechanism is connected to the control shaft for indexing the cam plates to various positions to simultaneously place the conveyor and distributing units in compatible modes of operation.

PATENTED JUN 8 1971
3,583,242
SHEET 1 OF 2
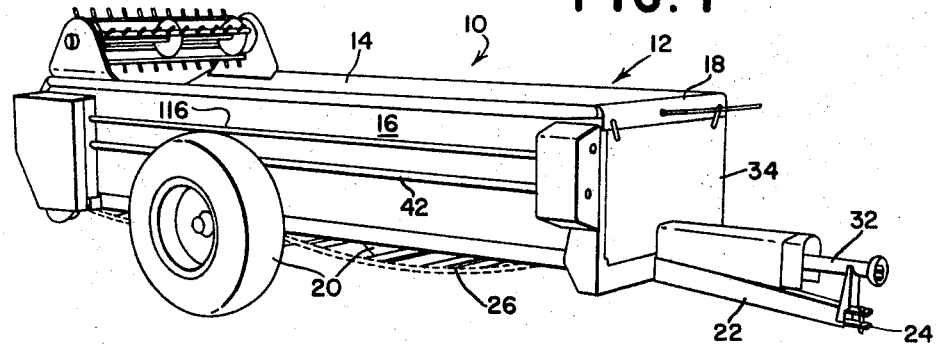
FIG. 1
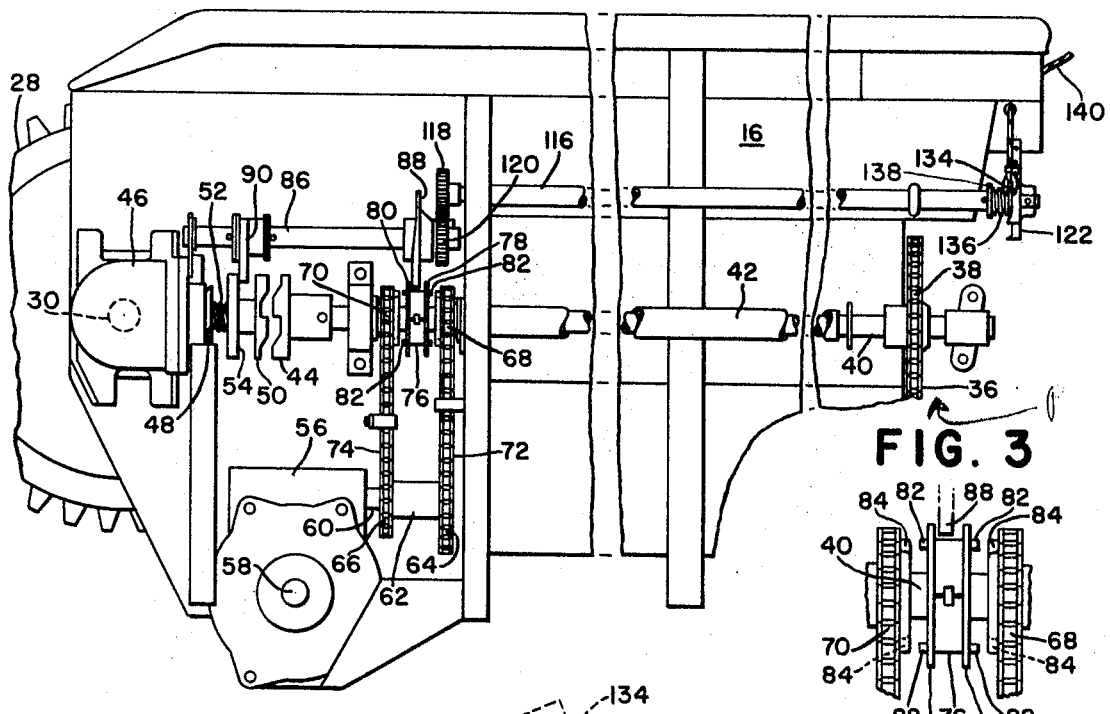
FIG. 2
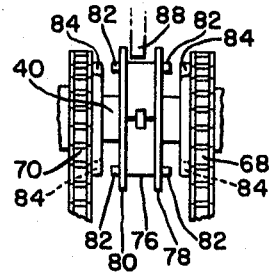
FIG. 3
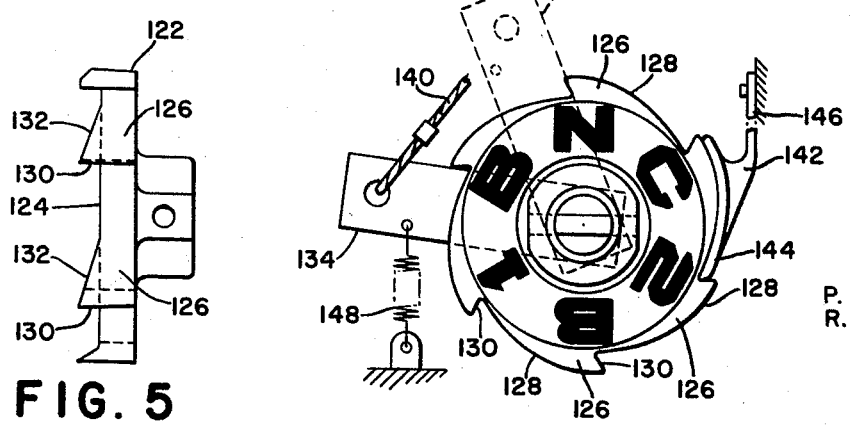
FIG. 5
FIG. 4
INVENTORS
P. J. THORNBLOOM
R. S. WILKES

*INVENTORS*
P. J. THORNBLOOM
R. S. WILKES 3,583,242

DRIVE AND CONTROL FOR THE CONVEYOR AND DISTRIBUTING UNIT OF A MATERIAL UNLOADER

BACKGROUND OF THE INVENTION

The present invention relates to material unloading devices and more particularly relates to devices of the type including a variable-speed unloading conveyor and a distributing unit.

Material unloading devices, such as manure spreaders, generally comprise a box or container having a conveyor positioned in the bed or floor to move material at a selected rate to a distributing unit, such as a beater or widespread, at the rear open end of the box. Conventionally, the conveyor and a distributing unit are often powered by the same drive source, which, in the case of towed unloading devices, is often the power takeoff of a tractor.

Material unloaders of the above-mentioned type normally have their power sources connected to drive their conveyors either through a ratchet wheel and pawl mechanism or through a worm gear drive or the like. One of the major drawbacks of the ratchet wheel and pawl mechanisms is that they are relatively complex and a relatively complex control means is required to adjust the mechanism for driving the conveyor at various speeds. Worm gear drives, on the other hand, are quite simple, however, heretofore suitable speed change means for use in conjunction with the worm gear drives have been unavailable.

Another disadvantage of the prior art material unloaders is that in those which have a single control for simultaneously controlling the operation of the conveyors and distributing units, the control is complex and/or difficult for the operator to manipulate properly without leaving the tractor seat.

SUMMARY OF THE INVENTION

According to the present invention, there is provided a novel combined drive and control for the conveyor and distributing unit of a material unloader.

A broad object of the invention is to provide a simple, reliable, easy to assemble drive and control.

More specifically, it is an object of the invention to provide a first selectively engageable clutch for connecting the power source optionally to one or the other of first and second speed drives for the conveyor and to provide a second selectively engageable clutch for connecting the power source to the distributing unit.

A further object is to provide a control including a pair of cam plates for causing engagement of the clutches.

Still another object is to fix the cam plates on a single shaft and to provide an indexing mechanism for rotating the cam plates to effect a desired sequence of operation of the conveyor and distributing unit.

Another object is to provide cam plates which have specially configured surfaces for effecting smooth engagement and disengagement of the clutches.

These and other objects will become apparent from the ensuing description and the appended drawings.

BRIEF DESCRIPTION OF THE DRAWINGS

FIG. 1 is a perspective view of a material unloading device in which the present invention is embodied.

FIG. 2 is an enlarged partial side view of the device illustrated in FIG. 1 with shields removed to expose the drive and control for the conveyor and distributing unit.

FIG. 3 is a view showing the clutch for engaging the first and second speed drives of the conveyor.

FIG. 4 is a front view of the indexing mechanism.

FIG. 5 is a side view of the indexing wheel shown in FIG. 4.

DESCRIPTION OF THE PREFERRED EMBODIMENT

Figure 7:
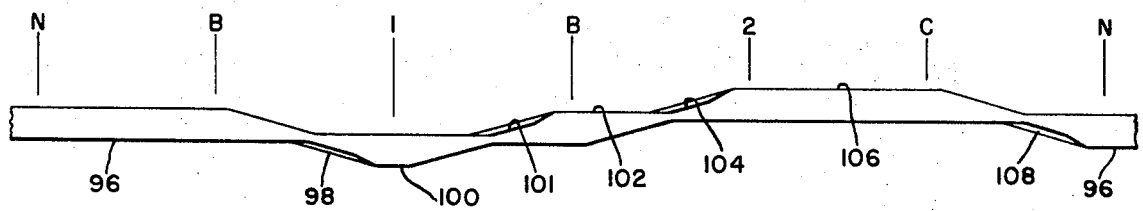
FIG. 7 is a view of the development of the cam plate illustrated in FIG. 5.

Referring now to FIG. 1, there is shown a material unloading device 10 including a box or container 12 having opposite sidewalls 14 and 16, a front wall 18 and a bed or floor (not shown). The box 12 is supported on a pair of ground wheels 20 and a hitch 22 extends forwardly from the box and includes a clevis 24 adapted for connection to a towing vehicle such as a tractor (not shown).

A conveyor 26 is mounted in the bed of the box 12 in a manner well known in the art and is operable for advancing material rearwardly in the box to a distributing unit or beater 28 spaced upwardly from the conveyor 26 and connected in the rear open end of the box 12 by means of a cross-shaft 30.

The towing vehicle (not shown) provides a common source of power for driving the conveyor 26 and the beater 28. The power is taken off the tractor PTO by means of a power takeoff shaft 32 supported on the hitch 22. A shield 34 at the front of the box 12 normally covers a drive chain 36 which is interconnected between a sprocket (not shown) fixed on the aft end of the shaft 32 and a sprocket 38 fixed on the front end of the drive shaft 40 mounted on the side 16 of the spreader box. A tubular sheath 42 receives a major portion of the drive shaft 40 and protects the drive shaft from the elements while the distal end of the drive shaft 40 is normally protected by a shield 42 which also covers drive and control elements, to be described below, for the conveyor and beater.

The distal end of the drive shaft 40 has a jaw clutch member 44 fixed thereto. A gear case 46 of conventional construction has an output shaft (not shown) connected to the cross-shaft 30 of the beater 28 and has an input shaft 48 in axial alignment with the drive shaft 40. A jaw clutch member 50 is shiftably mounted on the input shaft 48 and a coil spring 52 acts between the gear case 46 and the rearward face of a flange 54 of the clutch member 50 to engage the clutch members 44 and 50 so as to connect the drive shaft 40 to the beater 28. The output of a second gear case 56 is connected to a cross-shaft 58 which carries drive sprockets (not shown) for driving the conveyor 26 in a manner known in the art. The gear case 56 has an input shaft 60 disposed parallel to the drive shaft 40. A casting 62 having a first sprocket 64 secured to one end and a second smaller sprocket 66 secured to the other end is keyed to the input shaft 60 for drivingly rotating the same upon rotation of the sprockets. A pair of like sprockets 68 and 70 are mounted in axially spaced relationship on the drive shaft 40 for rotation relative thereto and a pair of drive chains 72 and 74 respectively connect the sprockets 68 and 70 to the sprockets 64 and 66 to define respective slow and fast speed drives. A clutch member 76 is fixed for rotation with and is shiftably mounted on the drive shaft 40 between the sprockets 68 and 70. The clutch member 76 includes a central hub with flanges 78 and 80 at opposite ends. Diametrically spaced pairs of lugs 82 extend axially from the peripheries of the flanges 78 and 80 toward the sprockets 68 and 70 which sprockets respectively have pairs of complementary radial surfaces 84 disposed for engagement by the lugs 82. Thus, by shifting the clutch member 76 forward or to the right (FIG. 2), the sprocket 68 is drivingly engaged for driving the larger sprocket 64 which results in the conveyor 26 being advanced at a slow speed, and by shifting the clutch member 76 rearwardly or to the left, the sprocket 70 is drivingly engaged for driving the smaller sprocket 66 which results in the conveyor 26 being advanced at a somewhat faster speed.

A control for shifting the clutch members 50 and 76 is provided and includes a control shaft means including a rear shaft section 86 mounted adjacent and parallel to the rear portion of the drive shaft 40. A generally circular cam plate 88 and a generally semicircular cam plate 90 are fixed to the shaft section 86 and have respective outer rims 92 and 94 which trace paths between the flanges 78 and 80 of the clutch member 76 and axially adjacent the front face of the flange 54 of the clutch member 50.

The rim 92, proceeding from left to right in FIG. 7 includes a first control portion 96 for holding the clutch member 76 centered between and disengaged from the sprockets 68 and 70, a first forwardly extending ramp 98 for engaging and shifting the flange 78 forwardly and engaging the clutch member 76 with the sprocket 68, a second control portion 100 for receiving the flange 78 from the ramp 98 and for holding the clutch member 76 engaged, a first rearwardly extending ramp 101 for engaging and shifting the flange 80 rearwardly for disengaging the clutch member 76 from the sprocket 68, a third control portion 102 for receiving the flange 80 from the ramp 101 and for again holding the clutch member 76 centered between and disengaged from the sprockets 68 and 70, a second rearwardly extending ramp 104 for engaging and shifting the flange 80 rearwardly for engaging the clutch member 76 with the sprocket 70, a fourth control portion 106 for receiving the flange 80 from the ramp 104 and for holding the clutch member 76 engaged, and a second forwardly extending ramp 108 for engaging and shifting the flange 78 forwardly for disengaging the clutch member 76 and for returning the clutch member 76 to the centered position wherein it is controlled by the first control portion 96.

Figure 9:
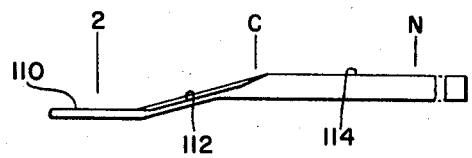
FIG. 9 is a view of the development of the cam plate illustrated in FIG. 8.

The rim 94, proceeding from left to right in FIG. 9, includes a first portion 110 for passing adjacent the front face of the flange 54 of the clutch member 50 when the clutch member is engaged, a rearwardly extending ramp 112 for engaging and shifting the flange 54 rearwardly for disengaging the clutch member 50 and a control portion 114 for receiving the flange 54 from the ramp 112 for holding the clutch member 50 disengaged. It is to be noted that when the control portion 114 is rotated past the flange 54, the spring 52 will return the clutch member 50 to its engaged position.

It is important to note that all of the above-mentioned ramps are angled in the neighborhood of 15° with respect to the control portions which they interconnect, and are operative to smoothly engage and shift the flanges with which they have contact.

As will be further explained below, the cam plates 88 and 90 are timed with respect to each other and the control portions of the rims are angularly arranged such that desired operational conditions are attained by rotating the shaft section 86 counterclockwise, as viewed from the front, to positions which are angularly spaced 60° apart.

The rear shaft section 86 is rotated by means of a front shaft section 116 that extends to the front of the box 12 and carries a gear 118 at its rear end meshed with a gear 120 of equal diameter on the front end of the rear shaft section 86. An indexing or sequencing means is provided for rotating the shaft sections 116 and 86 in 60° increments and includes a ratchet or indexing wheel 122 fixed to the front end of the shaft 116. The ratchet wheel 122 includes a central flat plate portion 124 having six teeth 126 spaced equally around its circumference. Each of the teeth 126 is defined by a generally arcuate guide surface 128 joining the radially outer edge of a generally radially extending shoulder 130, the arcuate guide surface of one tooth joining the radially inner edge of the shoulder 130 of the adjacent tooth. The teeth 128 flare axially to the rear from approximately midway between their ends to form rearwardly sloping ramps 132. A lever 134 is pivoted on the shaft 116 adjacent the rear side of the ratchet wheel 122 and is biased toward the ratchet wheel by means of a compression spring 136 acting between an abutment 138 on the shaft 116 and the lever. Normally, the lever 134 projects between the ramp 132 of one tooth and the shoulder 130 of the adjacent tooth and when swung counterclockwise the lever 134 engages the shoulder 130 and rotates the ratched wheel 122 in a clockwise direction. The lever 134 is swung by means of a rope 140 which has one end attached to the lever and the other end located at a position (not shown) in easy grasp of the operator of the towing vehicle. A pawl 142 having an arcuate shoe 144 fixed to a resilient strap 146 is positioned such that the arcuate shoe 144 normally rests on the arcuate guide surface 128 of one of the teeth 126 and abuts against the shoulder 130 of the adjacent tooth to prevent the ratchet wheel 122 from rotating counterclockwise. The resilient strap 146 permits the shoe 144 to ride over the arcuate guide surfaces 128 as the lever 134 is swung to advance the teeth 126 by the pawl 142. The lever 134 is swung only far enough to advance one tooth at a time by the pawl 142, then the tension on the rope 140 is relaxed to permit a tension spring 148 connected to the lever 134 to return it to its preswung position. The ramps 132 guide the lever 134 rearwardly from the plate portion 124 of the ratchet wheel 122 during the return swing of the lever 134 and once past the ramps, the compression spring 136 moves the lever towards the plate portion 124 to place the lever in position for engaging the shoulder 130 of the adjacent tooth.

Figure 6:
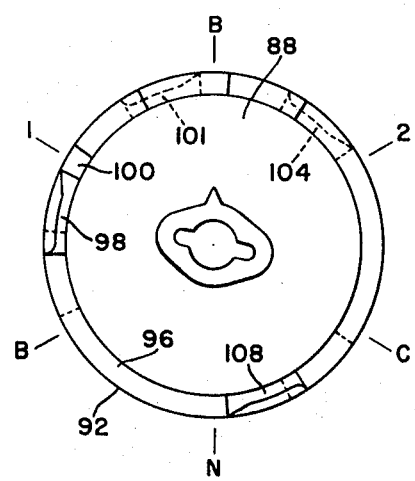
FIG. 6 is a front view of the conveyor speed control cam plate.
Figure 8:
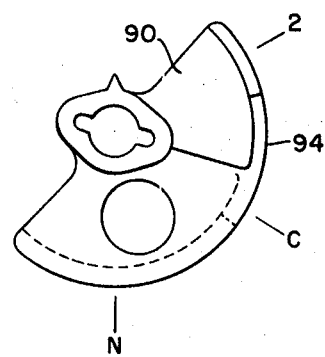
FIG. 8 is a front view of the distributing unit engaging cam plate.

The forward face of the plate portion 124 of the ratchet wheel 122 is in view of the operator of the towing vehicle and has indicia at six equispaced positions about its periphery to aid the operator in knowing the operational condition of the conveyor 26 and beater 28. The operational condition at any one time is that indicated by the indicia appearing at the top of the ratchet wheel 122. The indicia beginning from the top and proceeding counterclockwise (FIG. 4) and the operational conditions designated thereby are N for a neutral condition wherein both the conveyor and the beater are out of operation, B for a condition wherein only the beater is in operation, and 1 for a condition wherein the beater is in operation and the conveyor is driven at a slow speed, B for a condition wherein only the beater is in operation, 2 for a condition wherein the beater is in operation and the conveyor is driven at a fast speed, and C for a cleanout condition wherein only the conveyor is in operation and it is driven at a fast speed. The points along the rims of the cam plates 88 and 90 that cause the operational condition represented by the indicia on the ratchet wheel are designated by corresponding indicia in FIGS. 6—8, it being noted that when one of the indicia is at the top of the ratchet wheel 122, the point on the cams 88 and 90 designated by the corresponding indicia will be located at the bottom of the cam plate.

Briefly stated, the operation of the material unloading device 10 is as follows:

The unloading device 10 is hitched to a towing vehicle of the type having a power takeoff, such as a tractor, and the power takeoff shaft 32 of the unloading device is connected to the towing vehicle power takeoff. The box or container 12 is then loaded with material to be distributed on a field and the device is towed to the desired site for commencing the unloading of the material. Before engaging the power takeoff of the towing vehicle to rotate the drive shaft 40, the drive to the beater 28 is engaged by indexing the ratchet wheel 122 by alternately pulling and releasing the rope 140 until one or the other of the B's on the face of the ratchet wheel is at the top. Proceeding clockwise around the ratchet wheel (FIG. 3), if it is desired to operate the conveyor at a slow speed, the B preceding the numeral 1 is indexed to the top and if it is desired to operate the conveyor at a fast speed, the B preceding the numeral 2 is indexed to the top. Once the beater is engaged, the towing vehicle PTO is engaged and the beater is driven to discharge any material that may have packed thereunder during the loading process. The conveyor is then engaged by indexing the ratchet wheel 122 by pulling once on the rope 140. When there is only a small amount of material left in the box 12, the beater 28 will no longer be able to contact the material so it is desirable to disengage the beater. This is done by indexing the ratchet wheel 122 until the C is located at the top to establish the cleanout condition. After the material is unloaded, the conveyor 26 and beater 28 are both disengaged by indexing the ratchet wheel 122 to the position wherein the N is at the top. The PTO of the towing vehicle is then disengaged and the operation is repeated. Thus, it can be appreciated that desired operational conditions of the conveyor and beater can be obtained by a single control operable from the seat of the towing vehicle.

It can further be appreciated that the two unloading speeds of the conveyor combined with the various operating speeds of the towing vehicle provide a wide range of unloading rates.

We claim:

1. Means for driving and controlling the operation of a material unloader conveyor and distributor comprising: a drive shaft adapted for connection to a power source; conveyor and distributor drive input shafts; first selectively engageable and disengageable drive coupling means operatively connected between said drive shaft and said distributor drive input shaft; a slow speed power transfer means connected between said drive shaft and said conveyor drive input shaft; a fast speed power transfer means connected between said drive shaft and said conveyor drive input shaft; second selectively engageable and disengageable drive coupling means operatively connected between said drive shaft and slow and fast speed power transfer means; and control means operable for simultaneously, sequentially establishing operative conditions including firstly, a neutral condition wherein said first and second drive coupling means are disengaged, secondly, a condition wherein only said first drive coupling means is engaged, thirdly, a condition wherein said first drive coupling is engaged and said second drive coupling is engaged with said slow speed power transfer means, fourthly, a condition wherein only the first drive coupling means is engaged, fifthly, a condition wherein said first drive coupling means is engaged and said second drive coupling means is engaged with said fast speed power transfer means, and sixthly, a cleanout condition wherein only the second drive coupling means is engaged and it being engaged with said fast speed power transfer means.

2. The invention defined in claim 1 wherein said distribution drive input shaft is axially aligned with said drive shaft, said first engageable and disengageable drive coupling means includes a first clutch member fixed to said drive shaft and opposed to a second clutch member slidably mounted on said distributor drive input shaft, said slow and fast speed power transfer means each including a sprocket rotatably mounted on said drive shaft, said second engageable and disengageable drive coupling means including abutment surfaces on said sprockets and a lug-carrying member slidably mounted on said drive shaft between said sprockets and shiftable from a centered disengaged position to positions on either side of the centered position for engagement with one or the other of said slow and fast speed power transfer means, and said control means includes means operable for selectively engaging and disengaging said second clutch member and said lug-carrying member.

3. The invention defined in claim 2 wherein the last-mentioned means includes a pair of cam members.

4. The invention defined in claim 2 wherein said control means includes a control shaft means extending generally parallel and adjacent to said drive shaft and a pair of cam plates fixed for rotation with said control shaft at axial positions respectively adjacent said second clutch member and said lug-carrying member; said cam plates having axial surfaces around their peripheries positioned for engaging and shifting said second clutch member and said lug-carrying member.

5. The invention defined in claim 4 and further including means for rotating said control shaft means, said means for rotating including a pawl and ratchet wheel mechanism, said ratchet wheel being fixed to said control shaft means.

6. The invention defined in claim 5 wherein said ratchet wheel has six equispaced teeth having abutment surfaces including radially and axially extending portions, said pawl being positioned for sequential engagement with the radially extending abutment surface portions and said pawl and ratchet mechanism further including a lever pivoted for sequential engagement with the axially extending abutment surface portions.

7. The invention defined in claim 6 wherein said plurality of teeth each includes an arcuate surface connecting the outer end of its radially extending abutment surface portion with the inner end of the radially extending abutment surface portion of an adjacent tooth and wherein said pawl includes an arcuate shoe portion adapted to engage said arcuate portions of said teeth.

8. The invention defined in claim 6 wherein said lever is mounted on said control shaft and spring means biasing said lever axially on said control shaft toward said ratchet wheel and to a retracted radial position, said teeth further including a ramp extending axially inwardly from said axially extending portions of the abutment surfaces of said teeth and terminating about midway between the teeth and elongated flexible means attached to said lever for swinging the lever against the spring-biasing means from its retracted position whereby said control shaft is sequentially rotated by pulling the flexible means to swing the lever far enough to advance at least one of said teeth past said pawl and then relaxing the flexible means to permit the spring-biasing means to retract the lever to its retracted position.

9. The invention defined in claim 6 wherein the lever is mounted with respect to the ratchet wheel and swingable for advancing only one tooth at a time past the pawl and said cam surfaces on the cam plates being angularly spaced and timed such that one of said operative conditions is respectively obtained for each of the six positions of the ratchet wheel.

10. A control mechanism for engaging and shifting a pair of shiftably mounted drive coupling members comprising: a control shaft means including a section extending adjacent and parallel to the direction of shifting of said coupling members, first and second cam plates fixed for rotation with said control shaft section and having peripheral surfaces facing in the direction of shifting of said drive coupling members and each cam plate being positioned for engagement with one of said drive coupling members upon rotation of said control shaft means.

11. The invention defined in claim 10 wherein one of said drive coupling members includes portions extending on opposite sides of one of said cam plates and wherein said one cam plate includes peripheral surfaces on both sides facing said portion of said one drive coupling member.

12. A pawl and ratchet mechanism for indexing a control shaft comprising: a ratchet wheel fixed to said control shaft, said ratchet wheel including a plurality of equispaced teeth having abutment surfaces including radially and axially extending portions, a pawl positioned for sequentially engaging the radially extending portions of said abutment surfaces to prevent rotation of the ratchet wheel in one direction and a lever pivotally mounted for sequentially engaging the axially extending portions of said abutment surfaces.

13. The invention defined in claim 12 wherein said plurality of teeth each includes an arcuate surface connecting the outer end of its radially extending abutment surface portion with the inner end of the radially extending abutment surface portion of an adjacent tooth and wherein said pawl includes an arcuate shoe portion adapted to engage said arcuate portions of said teeth.

14. The invention defined in claim 12 wherein said lever is mounted on said control shaft and spring means biasing said lever axially on said control shaft toward said ratchet wheel and to a retracted radial position, said teeth further including a ramp extending axially inwardly from said axially extending portions of the abutment surfaces of said teeth and terminating about midway between the teeth and elongated flexible means attached to said lever for swinging the lever against the spring-biasing means from its retracted position whereby said control shaft is sequentially rotated by pulling the flexible means to swing the lever far enough to advance at least one of said teeth past said pawl and then relaxing the flexible means to permit the spring-biasing means to retract the lever to its retracted position.